United States Patent
Meredith et al.

(10) Patent No.: US 10,178,512 B2
(45) Date of Patent: Jan. 8, 2019

(54) INFORMATION BROADCAST

(71) Applicants: AT&T INTELLECTUAL PROPERTY I, L.P., Atlanta, GA (US); AT&T MOBILITY II LLC, Atlanta, GA (US)

(72) Inventors: Sheldon Kent Meredith, Roswell, GA (US); William Cottrill, Canton, GA (US); Jeremy Fix, Acworth, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 124 days.

(21) Appl. No.: 14/974,094

(22) Filed: Dec. 18, 2015

(65) Prior Publication Data

US 2017/0180950 A1    Jun. 22, 2017

(51) Int. Cl.
*H04L 29/08*    (2006.01)
*H04W 4/06*    (2009.01)
*H04L 12/26*    (2006.01)

(52) U.S. Cl.
CPC ............ *H04W 4/06* (2013.01); *H04L 43/106* (2013.01); *H04L 43/16* (2013.01); *H04L 67/06* (2013.01); *H04L 67/2852* (2013.01)

(58) Field of Classification Search
None
See application file for complete search history.

(56) References Cited

U.S. PATENT DOCUMENTS

| | | |
|---|---|---|
| 5,890,064 A | 3/1999 | Widergen et al. |
| 7,356,001 B1 | 4/2008 | Jones et al. |
| 7,574,202 B1 | 8/2009 | Tsao et al. |
| 7,660,265 B2 | 2/2010 | Kreuk |
| 8,385,896 B2 | 2/2013 | Proctor, Jr. et al. |
| 8,385,913 B2 | 2/2013 | Proctor, Jr. et al. |
| 8,601,569 B2 | 12/2013 | Segre et al. |
| 8,891,483 B2 | 11/2014 | Connelly et al. |
| 8,902,839 B2 | 12/2014 | Forssell |
| 8,918,503 B2 | 12/2014 | Luna |
| 2010/0098024 A1* | 4/2010 | Nagatake ............... H04W 36/02 370/331 |
| 2011/0035250 A1 | 2/2011 | Finucan |
| 2012/0150995 A1* | 6/2012 | Kunimatsu ............. H04L 51/16 709/217 |

(Continued)

OTHER PUBLICATIONS

"How to Configure Guest Network on Dual Band Wireless Routers?" TP-Link®, tp-link.com, accessed: Oct. 2015, http://www.tp-link.com/en/faq-649.html, 4 pp.

(Continued)

*Primary Examiner* — Brandon M Renner
(74) *Attorney, Agent, or Firm* — Toler Law Group, PC

(57) ABSTRACT

An apparatus includes a communications interface configured to receive a transmission from a wireless device. The transmission may include a beacon message and a date file. The apparatus may further include a memory device and a processor. The processor may be configured to determine whether a threshold is satisfied based on whether additional transmissions including the data file are received from the wireless device. The processor may be further configured to cause the memory device to store the data file in response to determining that the threshold is satisfied.

20 Claims, 7 Drawing Sheets

(56) References Cited

U.S. PATENT DOCUMENTS

| | | | |
|---|---|---|---|
| 2012/0254615 A1 | 10/2012 | Ma et al. | |
| 2013/0010600 A1* | 1/2013 | Jocha | H04L 43/026 370/236.2 |
| 2015/0163019 A1* | 6/2015 | Birrittella | H04L 1/1657 714/749 |
| 2015/0215890 A1* | 7/2015 | Nagatomo | H04W 64/00 455/456.1 |
| 2015/0223013 A1* | 8/2015 | Park | H04W 8/02 455/41.2 |
| 2015/0312164 A1* | 10/2015 | Yasunaga | H04W 12/08 709/203 |
| 2016/0095063 A1* | 3/2016 | Vigier | H04W 52/0229 455/574 |
| 2016/0277999 A1* | 9/2016 | Graves | H04W 40/244 |
| 2017/0032354 A1* | 2/2017 | Tilahun | G06Q 20/3223 |

OTHER PUBLICATIONS

"Wireless Network Secure and Unsecured?" tom's Hardware, tomshardware.com, Nov. 28, 2006, http://www.tomshardware.com/forum/22694-42-wireless-network-secure-unsecured, 6 pp.

Martins, D., et al.; "Steganography in Mac Layers of 802.15.4 Protocol for Securing Wireless Sensor Networks", IEEE 2010 International Conference on Multimedia Information Networking and Security (MINES), 2010, https://hal.archives-ouvertes.fr/hal-00661, 6 pp.

Bostrom, A., "Centralized Router Configuration", KTH Computer Science and Communication, 2009, ttp://www.cs.purdue.edu/homes/fahmy/papers/PID2822909.pdf, 92 pp.

* cited by examiner

INFORMATION BROADCAST

FIELD OF THE DISCLOSURE

The present disclosure is generally related to information broadcast.

BACKGROUND

An operator of a wireless LAN may exclude certain devices from connecting to the wireless LAN. For example, a business may have a wireless LAN for use in performing business functions and may therefore secure the wireless LAN to prevent members of the general public from accessing (e.g., connecting to) the wireless LAN. However, the operator of the wireless LAN may benefit from providing some information over wireless communications. For example, a business might benefit from providing a store map or business hours to customers who are within range of a WiFi access point (e.g., in the store). Thus, the operator may either maintain two networks (one secure and the other public), maintain one unsecure network for both business and general public use, maintain a secure network and provide access credentials to customers in the store, or forgo the opportunity to provide information wirelessly to customers.

DETAILED DESCRIPTION

The present disclosure describes systems and methods of broadcasting and receiving information. In a particular example, a transmitting device, such as a wireless access point (WAP) of a wireless local area network (WLAN) may periodically broadcast a transmission that includes a beacon and a data file. The beacon may include information related to establishing a wireless connection (e.g., a two-way communication session) with the WAP, such as a media access control (MAC) address, a service set identifier (SSID) of the WLAN, or a combination thereof. A wireless device may receive the data file as part of the transmission without needing to first establish a wireless connection with the WAP. Accordingly, the data file may be distributed quickly and without compromising security of the WLAN.

In a particular embodiment, an apparatus includes a communications interface configured to receive a transmission from a wireless device. The transmission may include a beacon message and a date file. The apparatus may further include a memory device and a processor. The processor may be configured to determine whether a threshold is satisfied based on whether additional transmissions including the data file are received from the wireless device. The processor may be further configured to cause the memory device to store the data file in response to determining that the threshold is satisfied.

In another embodiment, a method includes detecting, at a first wireless device, a transmission from a second wireless device. The transmission may include a beacon message and a data file. The method may further include determining whether a threshold is satisfied based on whether additional transmissions including the data file are received from the second wireless device. The method may further include, in response to determining that the threshold is satisfied, storing the data file at a memory of the first wireless device.

In another particular embodiment, a computer readable storage device stores instructions that, when executed by a processor, cause the processor to perform operations. The operations may include detecting, at a first wireless device, a transmission from a second wireless device. The transmission may include a beacon message and a data file. The operations may further include determining whether a threshold is satisfied based on whether additional transmissions including the data file are received from the wireless device. The operations may further include, in response to determining that the threshold is satisfied, storing the data file.

Figure 1:
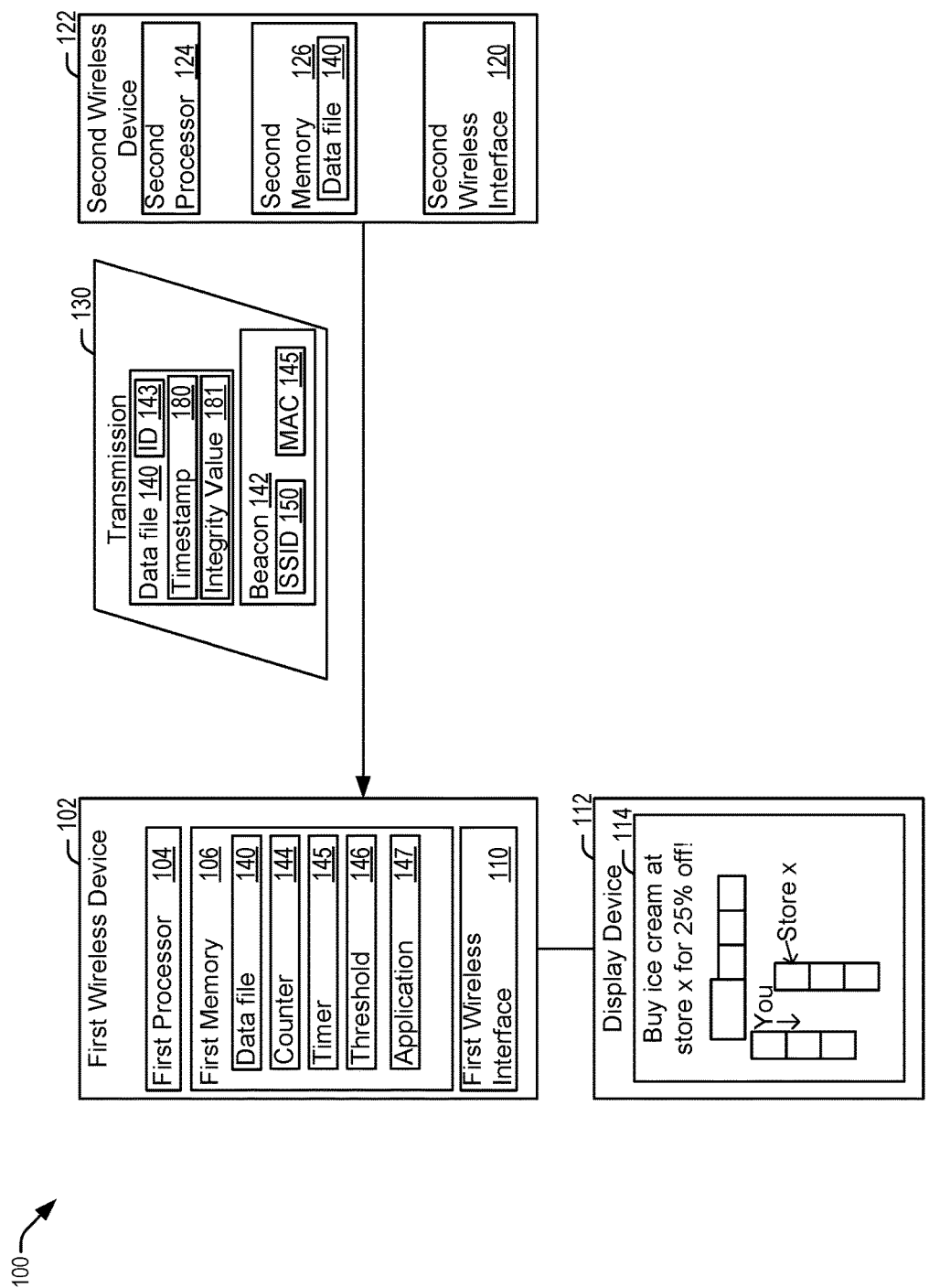
FIG. 1 is a block diagram of a system for broadcasting and receiving information.

Referring to FIG. 1, a block diagram of a system 100 for broadcasting and receiving information is shown. The system 100 includes a first wireless device 102 and a second wireless device 122. The first wireless device 102 may include a mobile device, such as a mobile phone, a tablet computer, a laptop computer, etc. The second wireless device 122 may be configured to provide a service (e.g., access to a wireless local area network (WLAN)) and may include a wireless access point (WAP), a wireless beacon device, or another type of wireless device that provides the service. In a particular embodiment, the second wireless device 122 provides wireless access to the Internet.

The first wireless device 102 includes a first processor 104, a first memory 106, and a first wireless interface 110. The first processor 104 may include a central processor unit (CPU). The first memory 106 may include a random access memory, a solid state drive, a hard disk drive, or any other type of memory device. In some implementations, access to the first memory 106, or portions of the first memory 106, is restricted. For example, particular data stored in the first memory 106 may be accessible to particular applications but not to other applications. Accordingly, the first memory 106, or portions of the first memory 106, may be considered a "secure memory."

The first wireless interface 110 may include an interface configured to operate according to an Institute of Electrical and Electronics Engineers (IEEE) standard, such as an IEEE 802.11 specification or an IEEE 802.16 specification, a Bluetooth® specification, some other wireless communications protocol, or a combination thereof (Bluetooth is a registered trademark of Bluetooth Special Interest Group of Kirkland, Wash.). While not shown, the first wireless device 102 may include additional wireless interfaces.

The first wireless device 102 may be associated with (e.g., in communication with) a display device 112, such as a touch screen device or other display. In addition, the first wireless device 102 may include or be associated with other types of output devices, such as a speaker or a printer.

The second wireless device 122 includes a second processor 124, a second memory 126, and a second wireless interface 120. The second processor 124 may include a CPU.

The second memory 126 may include a random access memory, a solid state drive, a hard disk drive, or any other type of memory device. The second wireless interface 120 may include an interface configured to operate according to an IEEE standard, such as an IEEE 802.11 specification or an IEEE 802.16 specification, a Bluetooth® specification, some other wireless communications protocol, or a combination thereof. While not shown, the second wireless device 122 may include additional wireless interfaces. Furthermore, the second wireless device 122 may include a wired communications interface configured to communicate via wired standard, such as an IEEE 802.3 specification.

In operation, the second wireless device 122 periodically broadcasts a beacon 142 via the second wireless interface 120. The beacon 142 may advertise a wireless service (e.g., connection to a WLAN, to the Internet, or a combination thereof) offered by the second wireless device 122. The beacon 142 may include information usable to establish a connection with the second wireless device 122. For example, the beacon 142 may include a service set identifier (SSID) 150, a media access control (MAC) address 145, or a combination thereof. The second wireless device 122 may include a data file 140 in broadcasts of the beacon 142. In the example illustrated in FIG. 1, the second wireless device 122 broadcasts a transmission 130 that includes the data file 140 and the beacon 142.

In particular embodiments, the data file 140 includes (or references) information, such as a coupon, a map, an offer for sale, store hours, a phone number, location information, or a combination thereof. In some examples, the data file 140 may include a reference (such as a universal resource locator) to additional data. In some examples, the data file 140 includes self-describing content, such as a JavaScript® Object Notation (JSON) file (JavaScript is a registered trademark of Oracle America, Inc. of Redwood Shores, Calif. The second wireless device 122 may store the data file 140 in the second memory 126. In particular examples, the second wireless device 122 may retrieve (e.g., in response to user input) the data file 140 from another device, such as a file server (not shown).

The data file 140 may include an identifier 143, a timestamp 180, and an integrity value 181. In a particular embodiment, the timestamp 180 may be based on a time that the data file 140 was created (e.g., by the second wireless device 122 or by another device, such as a file server). A portion of the identifier 143 may indicate that the data file 140 is associated with a particular sender (e.g., a business, such as a particular store) and/or application. The integrity value 181 may be based on the timestamp 180 and may be useable by a device, such as the first wireless device 102, to verify integrity of the data file 140 (e.g., to verify that the data file 140 is actually from the particular sender identified by the identifier 143 or another trusted source), as described below with reference to FIGS. 2 and 3.

The first wireless device 102 may receive the transmission 130 via the first wireless interface 110. In a particular embodiment described in more detail with reference to FIG. 2, the first processor 104 automatically executes a first application 147 stored in the first memory 106 in response to determining that the identifier 143 corresponds to the application 147. In an alternative embodiment, the first processor 104 executes the application 147 in response to user input.

The application 147 may be executable by the first processor 104 to determine whether to store the data file 140 in the first memory 106 and/or whether to send content (e.g., a coupon, map, offer for sale, etc.) associated with the data file 140 to the display device 112. The application 147 may determine to store the data file 140 based on whether a threshold 146 is satisfied. In particular examples, the application 147 may determine that the threshold 146 is satisfied based on whether the first wireless device 102 receives additional transmissions (e.g., subsequent to the transmission 130) of the data file 140. For example, as described further with reference to FIG. 4, the application 147 may initiate a counter 144 that tracks a number of times the data file 140 is received by the first wireless device 102. In response to determining that the counter 144 satisfies the threshold, the application 147 may cause the first processor 104 to store the data file 140 in the first memory 106 and/or to present content associated with data file 140 via an output device (e.g., the display device 112, a speaker, a printer, etc.). Alternatively, as described in more detail with reference to FIG. 5, the application 147 may initiate a timer 145 in response to receiving the data file 140 as part of the transmission 130. The application 147 may reset the timer 145 in response to determining that no additional transmission of the data file 140 is received during a timeout period or window. In response to determining that the timer 145 satisfies the threshold 146, the application 147 may cause the first processor 104 to store the data file 140 in the first memory 106 and/or to present content associated with data file 140 via an output device (e.g., the display device 112, a speaker, a printer, etc.). Since the data file 140 is not stored at the first wireless device 102 automatically in response to detecting the first transmission of the data file 140, the first wireless device 102 may not needlessly store every data file received from every wireless device that the first wireless device 102 briefly detects.

The first wireless device 102 may store the data file 140 without establishing a connection with the second wireless device 122 (e.g., without negotiating a two-way communication session) and without accessing the wireless service advertised by the beacon 142. For example, the second wireless device 122 may allow access to the service only to preapproved devices or based on credentials, such as a security key. The first wireless device 102 may not be a preapproved device or may not have access to the credentials. As another example, a user of the first wireless device 102 may not select to access the wireless service advertised by the beacon 142.

In the illustrated example, the application 147 causes the display device 112 to present a display 114 based on the data file 140. The display 114, for example, depicts a map, an offer for sale, and a coupon based on the data file 140. In other embodiments, different content may be output based on the data file 140. For example, audio content may be output at a speaker. The application 147 may utilize a user interface functionality of an operating system of the first wireless device 102 to generate the display 114. Accordingly, the display 114 may use graphical elements used by other applications executed on the first wireless device 102.

In a particular illustrative example, the second wireless device 122 may correspond to a WAP that provides access to a WLAN in a service area associated with a store (e.g., inside the store) and the first wireless device 102 may correspond to a mobile device of a customer near or inside the store. Using the system 100, an owner of the store may distribute content via the data file 140 without allowing the first wireless device 102 access to the WLAN. In addition, the first wireless device 102 may not store every data file received while the customer moves through coverage areas of WAPs provided by different stores (e.g., in a mall).

Therefore, the system 100 may be used to distribute and automatically present content wirelessly without requiring a connection to be formed between two devices. Further, a user may not be required to manually navigate to the content (e.g., via a web browser) to access the content. Accordingly, a provider of a wireless service (e.g., a WLAN) may relatively easily distribute content to individuals without allowing access to the wireless service.

Figure 2:
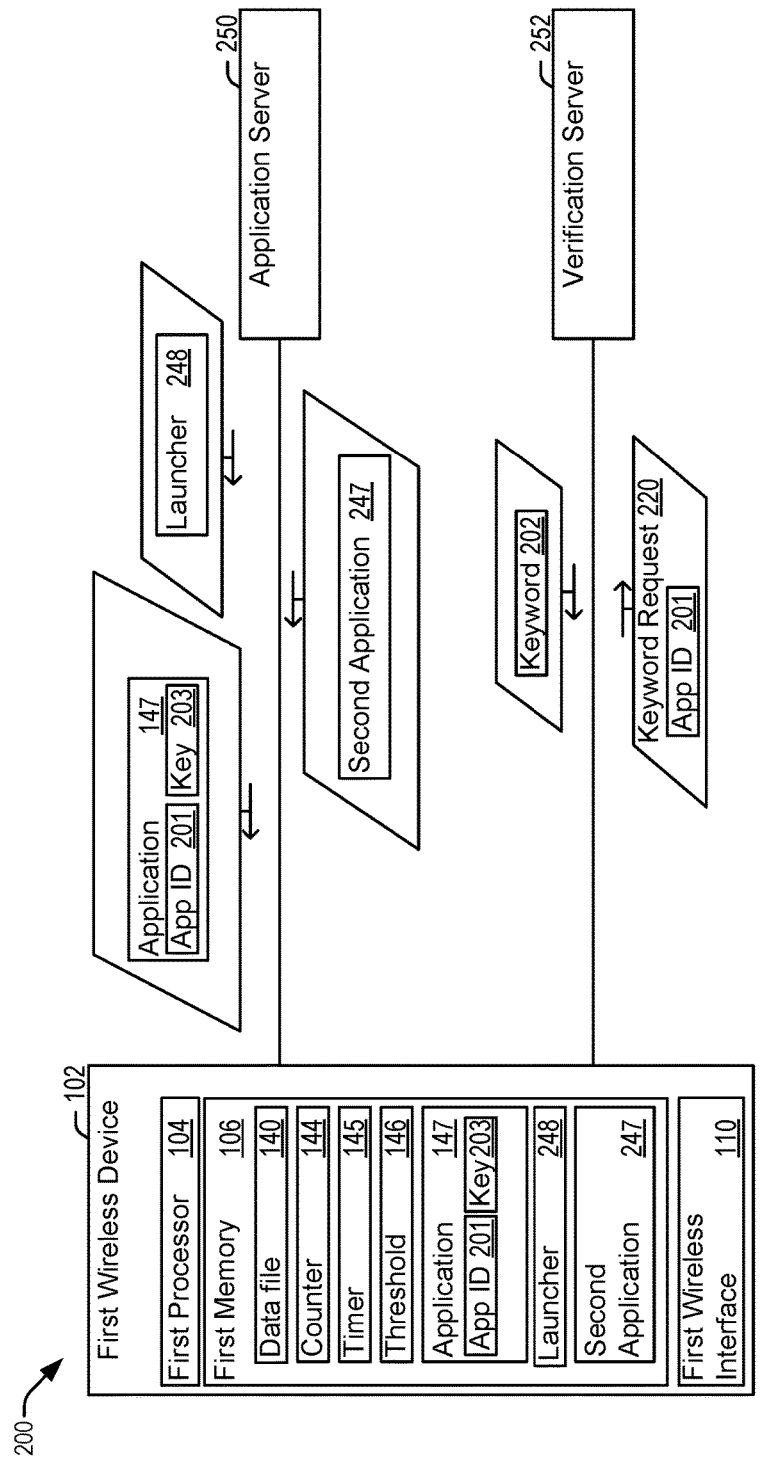
FIG. 2 is a block diagram of an embodiment of a system for distributing and receiving applications used for receiving and processing broadcast information.

Referring to FIG. 2, a system 200 for distributing and receiving applications used for receiving and processing broadcast information is shown. The system 200 includes the first wireless device 102 depicted in FIG. 1. The first wireless device 102 is in communication with an application server 250. While shown communicating directly, the first wireless device 102 and the application server 250 may communicate via one or more other devices and networks (e.g., the Internet). The application server 250 may correspond to any computing device that distributes an application. The system 200 further includes a verification server 252. The verification server 252 may be associated with an entity (e.g., a business) associated with the application 147. The first wireless device 102 may transmit messages to and receive messages from the application server 250 and the verification server 252 via the first wireless interface 110, another interface (e.g., a wired interface), or a combination thereof.

The first wireless device 102 may receive (e.g., in response to a request sent to the application server 250) the application 147 from the application server 250. The application 147 may include one or more elements used to verify integrity of data files purporting to be associated with the application (e.g., associated with the business associated with the application). In the example illustrated in FIG. 2, the application 147 includes a key 203 and an application identifier (ID) 201. The verification server 252 may be configured to transmit keywords that are encrypted based on secret keys (e.g., the key 203) distributed with the applications by the application server 250. Wireless devices, such as the second wireless device 122, may distribute data files to the devices executing the applications. The data files may include values (e.g., the integrity value 181) that are set (e.g., by the second wireless device 122 or by a file server) based on the keywords determined by the verification server. Thus, an application (e.g., the application 147) may verify that a data file (e.g., the data file 140) is associated with a particular sender or other trusted source based on comparing a value (e.g., the integrity value 181) in the data file with a keyword (e.g., the keyword 202) received from the verification server 252. In particular examples, the verification server 252 periodically updates keywords.

In the illustrated example, the application 147 may transmit the application ID 201 to the verification server 252 as part of a keyword request 220. In some implementations the application 147 may send a keyword request periodically (e.g., every 10 seconds) or in response to detecting a data file associated with the application 147. Thus, in implementations in which the verification server 252 periodically updates the keyword 220, the application 147 may periodically receive an updated keyword. The verification server 252 may identify a keyword 202 based on the application ID 201. For example, the application ID 201 may identify the application 147 as being associated with a particular business, and the verification server 252 may identify the keyword 202 as being associated with the particular business. Furthermore, the verification server 252 may identify (e.g., based on data from the application server 250) the secret key 203 known to the application 147. The verification server 252 may transmit the keyword 202 to the first wireless device 102 encrypted using the key 203. The keyword 202 may be used, as described with reference to FIG. 3, to verify integrity of a received data file (e.g., the data file 140).

In some implementations, the first wireless device 102 may further receive a second application 247 and a launcher 248 from the application server 250. One or more of the application 147, the second application 247, and the launcher 248 may be received by the first wireless device 102 from a device other than the application server 250. Further, the first wireless device 102 may receive additional applications. The first wireless device 102 may store the application 147, the second application 247, and the launcher 248 in the first memory 106. The launcher 248 may be executable to launch other applications (e.g., the application 147 and/or the second application 247) based on data files received by the first wireless device 102.

In implementations that include the launcher 248, the first processor 104 may execute the launcher 248 (e.g., in response to user input, automatically at device startup, etc.). The first processor 104 executing the launcher 248 may determine to execute (e.g., to launch) the application 147 in response to receiving the data file 140. For example, the launcher 248 may determine that the identifier 143 corresponds to the application 147 and launch the application 147 accordingly. In a particular example, the application 147 matches the identifier 143 when the identifier 143 is associated with a particular sender (e.g., a business) and the application 147 is also associated with the particular sender. In particular embodiments, the launcher 248 (rather than the application 147) may determine whether to store the data file 140. The launcher 248 may identify and determine to launch the application 147 in response to determining to store the data file 140.

Therefore, FIG. 2 illustrates a system that may enable distribution of one or more applications used to receive a data file and present associated content. Further, FIG. 2 illustrates distribution of a launcher that may be used to automatically execute an application that corresponds to a particular received data file.

Figure 3:
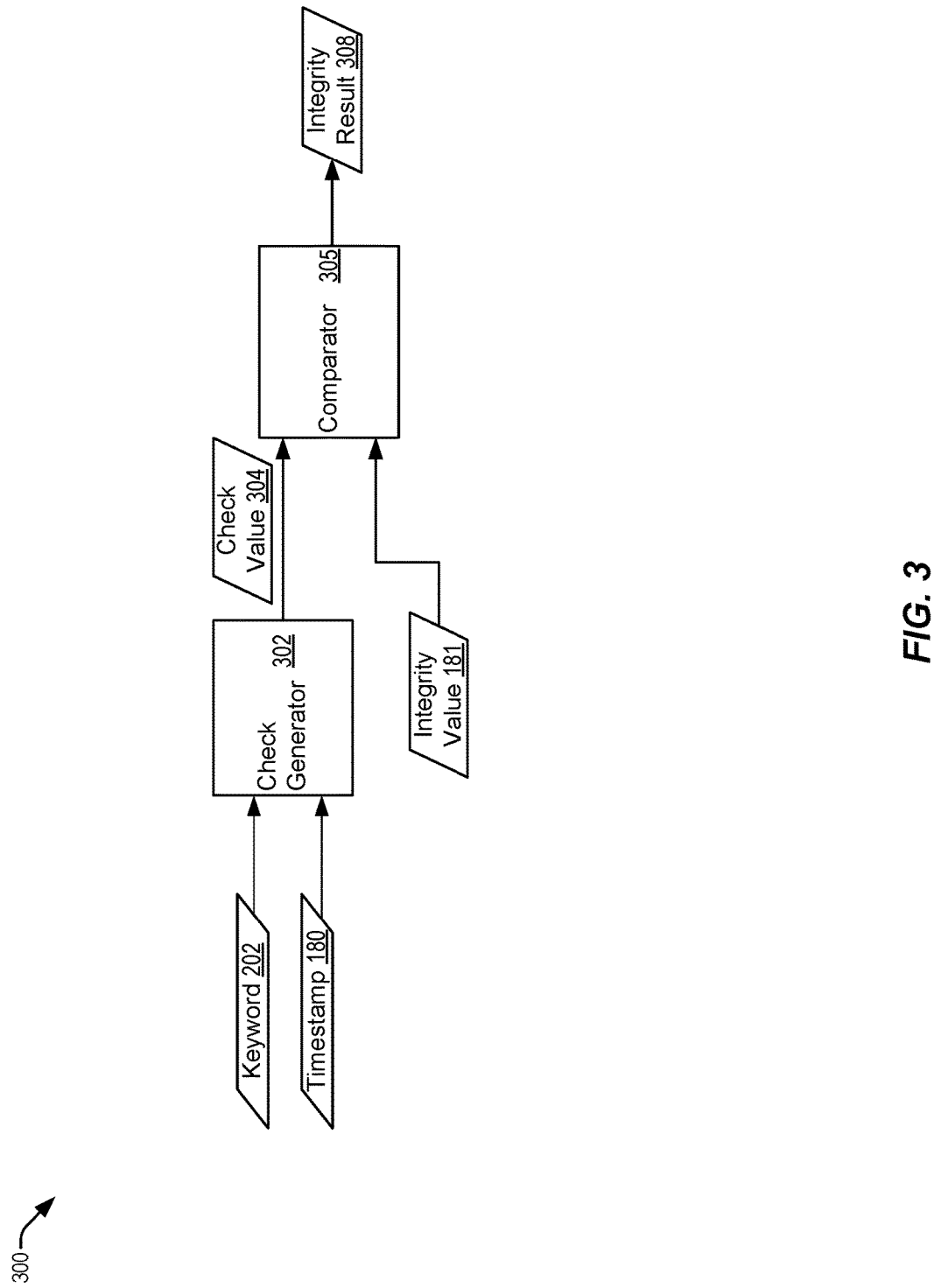
FIG. 3 is a diagram illustrating a method of verifying integrity of broadcast information.

Referring to FIG. 3, a diagram 300 illustrating a method of verifying integrity of broadcast information (e.g., a data file) is illustrated. An application, such as the application 147, may use the method illustrated in FIG. 3 to verify the integrity of a received data file based on a timestamp and an integrity value included in the data file and based on a keyword known by the application. For example, as illustrated in FIG. 2, the application 147 may send the keyword 202 and the timestamp 180 to a check generator 302 to generate a check value 304. The check generator 302 may correspond to a software component of the application 147 or to a hardware circuit of the first wireless device 102. In particular examples, the check generator 302 applies a one way function, such as a hash function, to the keyword 202 and the timestamp 180 to generate the check value 304.

The application 147 may send the check value 304 and the integrity value 181 included in the data file 140 to a comparator 305 to determine an integrity result 308. The comparator 305 may correspond to a software component of the application 147 or to a hardware circuit of the first wireless device 102. In response to determining that the check value 304 does not equal the integrity value 181, the comparator may cause the integrity result 308 to indicate that the data file 140 has failed an integrity check. In response to the data file failing the integrity check, the application 147 may not store the data file 140 in the first memory 106, may not present content associated with the data file 140 via an output device, may not allow the data file 140 to be accessed in the first memory 106, may generate and output (e.g., via the display device 112) a warning, or a combination thereof. In response to determining that the check value 304 does equal the integrity value 181, the comparator 305 may cause the integrity result 308 to indicate that the data file has passed the integrity check. In response to the data file passing the integrity check, the application 147 may store the data file 140 in the first memory 106, may present the content associated with the data file 140 via an output device, may enable the data file 140 to be accessed in the first memory 106, or a combination thereof.

Figure 4:
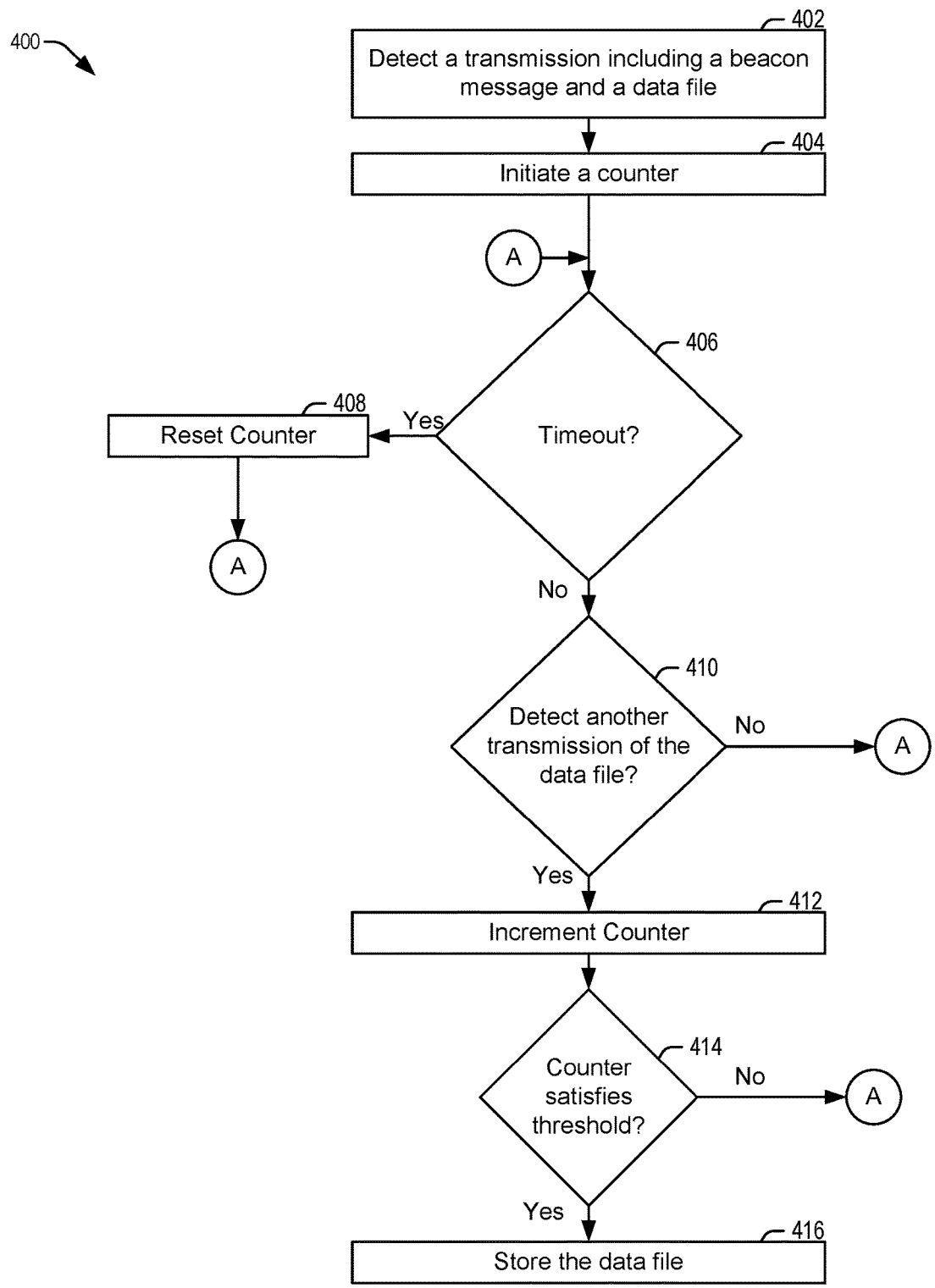
FIG. 4 is a flowchart of an illustrative embodiment of a method of receiving broadcast information.

Referring to FIG. 4, a flowchart of an illustrative embodiment of a method 400 of receiving broadcast information (e.g., a data file) is shown. The method 400 may be performed by a processor of a wireless device, such as the first processor 104 of the first wireless device 102, executing an application, such as the application 147 or the launcher 248.

The method 400 includes detecting a transmission including a beacon message and a data file, at 402. For example, the application 147 may determine that the transmission 130 including the beacon 142 and the data file 140 is received at the first wireless interface 110. The method 400 further includes initiating a counter, at 404. For example, the application 147 may initiate the counter 144 (e.g., create the counter 144 and set the counter 144 to an initial value, such as 1).

The method 400 may further include determining whether a timeout has occurred, at 406. A timeout may occur when no transmission of the data file is detected for a particular duration of time (e.g., a timeout period). For example, the application 147 may determine whether any transmission (including the transmission 130) of the data file 140 is received within a timeout period (e.g., the 10 seconds preceding the timeout determination). In some examples, the timeout period may be based on an expected beacon interval associated with the second wireless device 122. For example, the timeout period may be equal to a multiple of the expected beacon interval. In response to determining that a timeout has occurred (e.g., no transmission of the data file is detected within the timeout period), the method 400 includes resetting the counter, at 408, and returning to 406. For example, the application 147 may reset the counter (e.g., to 0) in response to determining that no transmission of the data file 140 is received within the timeout period.

In response to determining that a timeout has not occurred, the method 400 includes determining whether another transmission of the data file is detected, at 410. For example, the application 147 may determine whether an additional transmission of the data file 140 is received at the first wireless interface 110. In response to determining that no additional transmission of the data file is detected, the method 400 includes returning to 406 to determine whether a timeout has occurred. In response to determining that an additional transmission of the data file is detected, the method 400 includes incrementing the counter, at 412. For example, the application 147 may increment the counter 144 in response to detecting another transmission of the data file 140.

The method 400 further includes determining whether the counter satisfies a threshold, at 414. For example, the application 147 may determine whether the counter 144 satisfies the threshold 146. In response to determining that the counter does not satisfy the threshold, the method 400 includes returning to 406 to determine whether a timeout has occurred. In response to determining that counter satisfies the threshold, the method 400 includes storing the data file, at 416. For example, the application 147 may cause the first processor 104 to store the data file 140 in the first memory 106 in response to determining that the counter 144 satisfies the threshold 146.

Therefore, the method 400 may be used by a wireless device to receive and store content transmitted by another device without establishing a connection with the other device.

Figure 5:
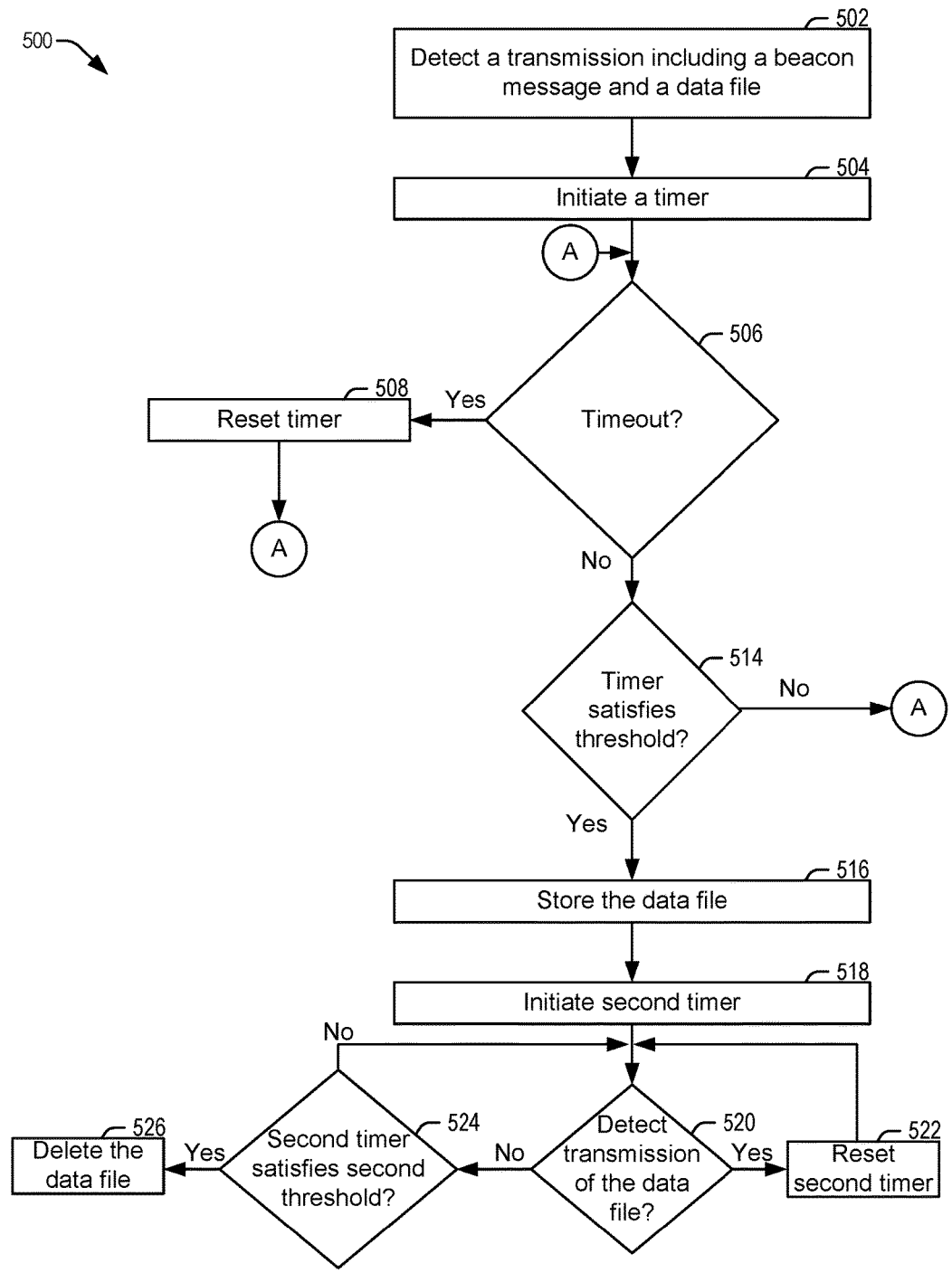
FIG. 5 is a flowchart of another illustrative embodiment of a method of receiving broadcast information.

Referring to FIG. 5, a flowchart of an illustrative embodiment of a method 500 of receiving broadcast information (e.g., a data file) is shown. The method 500 may be performed by a processor of a wireless device, such as the first processor 104 of the first wireless device 102, executing an application such as the application 147 or the launcher 248.

The method 500 includes detecting a transmission including a beacon message and a data file, at 502. For example, the application 147 may determine that the transmission 130 including the beacon 142 and the data file 140 is received at the first wireless interface 110. The method 500 further includes initiating a timer, at 504. For example, the application 147 may initiate the timer 145 (e.g., start the timer 145 from 0) in response to receiving the data file 140 as part of the transmission 130.

The method 500 may further include determining whether a timeout has occurred, at 506. A timeout may occur when no transmission of the data file is detected for a particular duration of time (e.g., a timeout period). For example, the application 147 may determine whether any transmission (including the transmission 130) of the data file 140 is received within a timeout period (e.g., the 10 seconds preceding the timeout determination). In some examples, the timeout period may be based on an expected beacon interval associated with the second wireless device 122. For example, the timeout period may be equal to a multiple of the expected beacon interval. In response to determining that a timeout has occurred (e.g., no transmission of the data file is detected within the timeout period), the method 500 includes resetting the timer, at 508, and returning to 506. For example, the application 147 may reset the timer (e.g., to 0) in response to determining that no transmission of the data file 140 is received within the timeout period.

In response to determining that a transmission of the data file 140 is received within the timeout period, the method 500 includes determining whether the timer satisfies a threshold, at 514. For example, the application 147 may determine whether the timer 145 satisfies the threshold 146. In response to determining that the timer does not satisfy the threshold, the method 500 includes returning to 506. In response to determining that the timer does satisfy the threshold, the method 500 includes storing the data file, at 516. For example, the application 147 may cause the first processor 104 to store the data file 140 in the first memory 106 in response to determining that the timer 145 satisfies the threshold 146.

The method 500 further includes initiating a second timer, at 518. For example, the application 147 may start a second timer after storing the data file 140 in the first memory 106. The method 500 further includes determining whether an additional transmission of the data file is detected, at 520. For example, the application 147 may determine whether an additional transmission of the data file 140 is received at the first wireless interface 110. In response to determining that an additional transmission of the data file is received, the method 500 further includes resetting the second timer, at 522, and returning to 520.

In response to determining that no additional transmission of the data file is received, the method 500 includes determining whether the second timer satisfies a second threshold, at 524. For example, the application 147 may determine whether the second timer satisfies a second threshold. In response to determining that the second timer does not satisfy the second threshold, the method 500 further includes returning to 520. In response to determining that the second timer satisfies the second threshold, the method 500 includes deleting the data file, at 526. For example, the application 147 may delete the data file 140 from the first memory 106 in response to determining that no transmission of the data file 140 is received for a period of time equaling or exceeding the second threshold (e.g., 10 seconds).

Thus, a wireless device operating according to the method 500 that is within range of another wireless device (e.g., a WAP) periodically transmitting a beacon along with a data file may store the data file automatically in response to detecting transmissions of the data file for a period of time. Further, the wireless device may automatically delete the data file in response to no longer detecting transmissions of the data file for a second period of time. To illustrate, a wireless device within a store may automatically store a data file associated with a WAP broadcasting within the store. Once the wireless device is moved outside of range of the WAP (e.g., has exited the store), the wireless device may automatically delete the data file. Therefore, the method 500 may be used by a wireless device to receive, store, and delete content transmitted by another device without establishing a connection with the other device.

It should be noted that steps from the methods 400 and 500 may be combined. For example, the method 400 may include 516-526 of the method 500. Accordingly, a device operating according to the method 400 may automatically delete data files.

Figure 6:
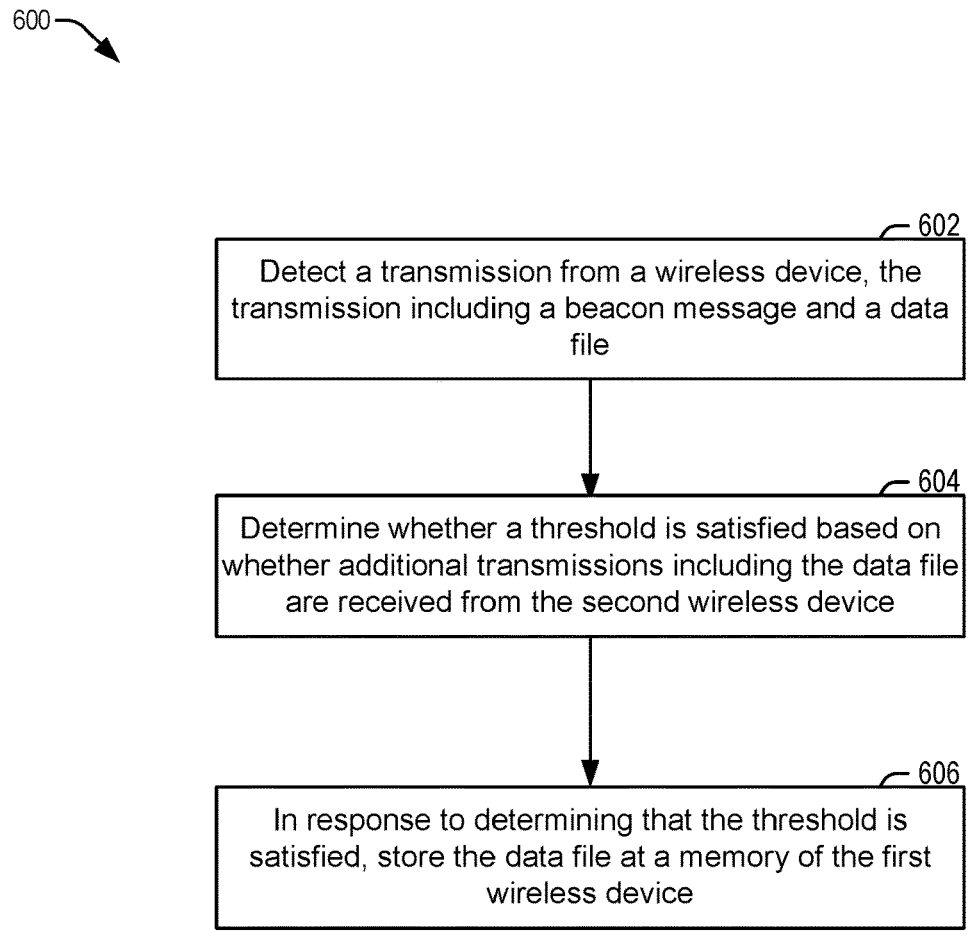
FIG. 6 is a flowchart of another illustrative embodiment of a method of receiving broadcast information.

Referring to FIG. 6, a flowchart of an illustrative embodiment of a method 600 of receiving broadcast information is shown. The method 600 includes detecting a transmission from a wireless device, the transmission including a beacon message and a data file, at 602. For example, the application 147 (or the launcher 248) executing on the first wireless device 102 may determine that the first wireless interface 110 has received the transmission 130 from the second wireless device 122. The transmission 130 includes the beacon 142 and the data file 140.

The method 600 further includes determining whether a threshold is satisfied based on whether additional transmissions including the data file are received from the second wireless device, at 604. For example, the application 147 (or the launcher 248) may determine whether the threshold 146 is satisfied based on the timer 145 or based on the counter 144. The counter 144 may be based on additional transmissions of the data file 140 in that the counter 144 may be incremented by the application 147 when transmissions of the data file 140 are received and may be reset when no transmission of the data file 140 is received within a timeout period. The timer 145 may be based on additional transmissions of the data file 140 in that the timer 145 may be reset by the application 147 when no transmission of the data file 140 is received within a timeout period.

The method 600 further includes, in response to determining that the threshold is satisfied, storing the data file at a memory device of the first wireless device, a 606. For example, the application 147 (or the launcher 248) may cause the first processor 104 to store the data file 140 at the first memory 106 in response to determining that the threshold 146 is satisfied.

Therefore, the method 600 may be used by a wireless device to receive and store content transmitted by another device without establishing a connection with the other device.

Figure 7:
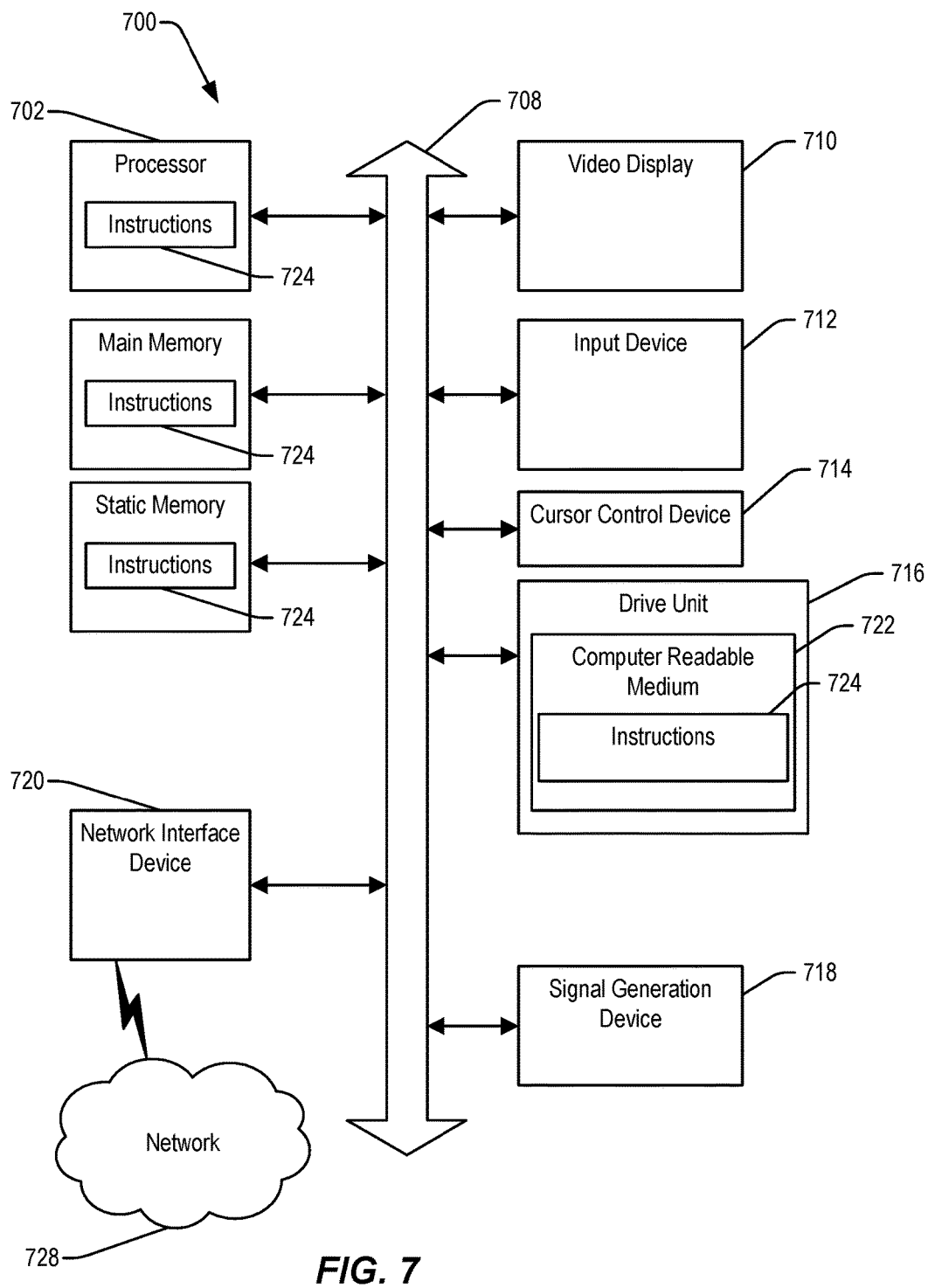
FIG. 7 is a block diagram of an illustrative embodiment of a general computer system.

Referring to FIG. 7, an illustrative embodiment of a general computer system is shown and is designated 700. The computer system 700 includes a set of instructions 724 that can be executed to cause the computer system 700 to perform any one or more of the methods or computer based functions disclosed herein. The computer system 700 may operate as a standalone device or may be connected, e.g., using a network, to other computer systems or peripheral devices. For example, the computer system 700 may include or be included within any one or more of the first wireless device 102, the second wireless device 122, the application server 250, or the verification server 252.

In a networked deployment, the computer system 700 may operate in the capacity of a server or as a client user computer in a server-client user network environment, or as a peer computer system in a peer-to-peer (or distributed) network environment. The computer system 700 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), an endpoint device, a web appliance, or any other machine capable of executing a set of instructions (sequential or otherwise) that specify actions to be taken by that machine. In a particular embodiment, the computer system 700 may be implemented using electronic devices that provide video, audio, or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. For example, the processor 702 may include or correspond to the first processor 104 of the first wireless device 102 illustrated in FIG. 1 or the second processor 124 of the second wireless device 122 illustrated in FIG. 1. Moreover, the computer system 700 may include a main memory 704 and a static memory 706, which can communicate with each other via a bus 708. For example, the main memory 704 may include or correspond to the first memory 106 of the first wireless device 102 of FIG. 1 or the second memory 126 of the second wireless device 122 of FIG. 1.

As shown, the computer system 700 may further include a video display unit 710, such as a liquid crystal display (LCD), a light emitting diode (LED) display, a touch screen display, a flat panel display, or a solid state display. The video display unit may correspond to the display device 112 of FIG. 1. Additionally, the computer system 700 may include an input device 712, such as a remote control device or a keyboard, and a cursor control device 714, such as a mouse. In some embodiments, video display unit 710, the input device 712, and the cursor control device 714 may be integrated into a single device, such as a capacitive touch screen input device. The computer system 700 may also include a signal generation device 718, such as a speaker, and a network interface device 720. Some computer systems 700 may not include one or more of an input device, a video display device, a signal generation device (e.g., a WAP may not include an input device).

In a particular embodiment, as depicted in FIG. 7, the computer system 700 may include computer-readable storage 722 in which one or more sets of instructions 724, e.g. software, can be embedded. The computer-readable storage 722 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or a processor. Computer-readable storage is not a signal. Further, the instructions 724 may embody one or more of the methods or logic as described herein. The instructions 724 may be executable by the processor 702 to perform one or more functions or methods described herein with reference to FIGS. 1-6. In a particular embodiment, the instructions 724 may reside completely, or at least partially, within the main memory 704, the static memory 706, and/or within the processor 702 during execution by the computer system 700. The main memory 704 and the processor 702 also may include a computer-readable storage device.

In a particular embodiment (e.g., when the computing system 700 corresponds to a wireless service providing device (e.g., a WAP), such as the second wireless device 122 of FIG. 1, the instructions 724 may be executable by the processor 702 to periodically broadcast transmissions of a beacon and a data file. In another particular embodiment (e.g., when the computing system 700 corresponds to a wireless device, such as the first wireless device 102 of FIG. 1, the instructions 724 may be executable by the processor 702 to receive and store such a data file. In some embodiments, the instructions 724 may correspond to the application 147, the launcher 248, or a combination thereof.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations may perform such operations directly or indirectly by way of one or more intermediate devices directed by the computing device.

While the computer-readable storage 722 is shown to be a single device, the computer-readable storage 722 may include a single device or multiple devices, such as a centralized or distributed database, and/or associated caches and servers that store one or more sets of instructions. The computer-readable storage 722 is capable of storing a set of instructions for execution by a processor to cause a computer system to perform any one or more of the methods or operations disclosed herein.

In a particular non-limiting, exemplary embodiment, the computer-readable storage 722 may include a solid-state memory such as embedded memory (or a memory card or other package that houses one or more non-volatile read-only memories). Further, the computer-readable storage 722 may be a random access memory or other volatile rewritable memory. Additionally, the computer-readable storage 722 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for device detection, short-range communications, and long-range communications can be used by the computer system 700 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines (e.g., virtual servers), components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An apparatus comprising:
    a communications interface configured to receive a beacon transmission from a wireless device, the beacon transmission including a beacon message and a data file, wherein the wireless device is configured to periodically broadcast beacon transmissions, each beacon transmission including the beacon message and the data file;
    a memory device; and
    a processor configured to:
        determine whether a value satisfies a threshold, the value based on a number of additional beacon transmissions received from the wireless device; and
        in response to the value satisfying the threshold:
            cause the memory device to store the data file;
            execute an application to display content based on the data file in response to determining that the data file is associated with the application; and
            verify, by the application, integrity of the data file, wherein verifying the integrity of the data file includes comparing a first value generated by the application to a second value included in the data file, the first value generated by the application based on a timestamp associated with the data file and a keyword accessible to the application.

2. The apparatus of claim 1, wherein the processor is further configured to:
    in response to detection of the beacon transmission, initiate a timer; and
    in response to no detection of a second beacon transmission from the wireless device for a threshold period of time, reset the timer, wherein the value is a time indicated by the timer.

3. The apparatus of claim 1, wherein the processor is further configured to:
    in response to detecting the beacon transmission, initialize a counter;
    increment the counter each time another beacon transmission is detected; and
    in response to no detection of a second beacon transmission from the wireless device for a threshold period of time, reset the counter, wherein the value is a count of the counter.

4. A method comprising:
    detecting, at a first wireless device, a beacon transmission from a second wireless device, the beacon transmission including a beacon message and a data file, wherein the second wireless device is configured to periodically broadcast beacon transmissions, each beacon transmission including the beacon message and the data file;
    determining whether a value satisfies a threshold, the value based on a number of additional beacon transmissions received from the second wireless device; and
    in response to the value satisfying the threshold:
        storing the data file at a memory of the first wireless device;
        executing, at the first wireless device, an application to display content based on the data file in response to determining that the data file is associated with the application; and
        verifying, at the first wireless device by the application, integrity of the data file, wherein verifying the integrity of the data file includes comparing a first value generated by the application to a second value included in the data file, the first value generated by the application based on a timestamp associated with the data file and a keyword accessible to the application.

5. The method of claim 4, further comprising:
    in response to detecting the beacon transmission, initializing a counter;
    incrementing the counter each time another beacon transmission from the second wireless device is detected; and
    in response to not detecting a second beacon transmission for a threshold period of time, resetting the counter, wherein the value is a count of the counter.

6. The method of claim 4, further comprising:
    in response to detecting the beacon transmission, initiating a timer; and
    in response to not detecting a second beacon transmission from the second wireless device for a threshold period of time, resetting the timer, wherein the value is a time indicated by the timer.

7. The method of claim 4, wherein the second wireless device is a wireless access point, and wherein the beacon message includes a service set identifier and a media access control address.

8. The method of claim 4, wherein the data file includes data that corresponds to a map, a coupon, an advertisement, or a combination thereof.

9. The method of claim 4, further comprising deleting the data file in response to determining that no additional beacon transmission is detected for a threshold period of time.

10. The method of claim 4, further comprising:
in response to storing the data file, initiating a timer;
in response to detecting an additional beacon transmission after initiating the timer, resetting the timer; and
in response to the timer indicating a threshold length of time, deleting the data file.

11. The method of claim 4, wherein the data file is stored by the first wireless device without establishing a connection to the second wireless device.

12. The method of claim 4, wherein the second wireless device comprises an access point.

13. The method of claim 4, further comprising determining that the data file is associated with the application based on an identifier included in a portion of the data file.

14. The method of claim 4, wherein the beacon message includes information for establishing a connection to a wireless local area network supported by the second wireless device.

15. The method of claim 14, wherein the first wireless device does not include particular information required by the second wireless device to allow access to the wireless local area network.

16. The method of claim 4, wherein the application is configured to receive a new keyword periodically.

17. The method of claim 4, wherein the application is configured to not generate output associated with the data file in response to determining that the first value does not match the second value.

18. The method of claim 4, further comprising displaying, at a display device coupled to the first wireless device, content based on the data file using a user interface functionality of an operating system of the first wireless device.

19. A computer-readable storage device storing instructions that, when executed by a processor, cause the processor to perform operations comprising:
detecting a beacon transmission from a wireless device, the beacon transmission including a beacon message and a data file, wherein the wireless device is configured to periodically broadcast beacon transmissions, each beacon transmission including the beacon message and the data file;
determining whether a value satisfies a threshold, the value based on additional beacon transmissions from the wireless device; and
in response to the value satisfying the threshold:
storing the data file;
executing an application to display content based on the data file in response to determining that the data file is associated with the application; and
verifying, by the application, integrity of the data file, wherein verifying the integrity of the data file includes comparing a first value generated by the application to a second value included in the data file, the first value generated by the application based on a timestamp associated with the data file and a keyword accessible to the application.

20. The computer-readable storage device of claim 19, wherein the operations further comprise:
in response to detecting the beacon transmission, initiating a counter;
incrementing the counter each time another beacon transmission from the wireless device is detected; and
in response to not detecting a second beacon transmission including the data file for a period of time, resetting the counter, wherein the value is a count of the counter.

* * * * *